(12) United States Patent
Yeh et al.

(10) Patent No.: US 11,847,467 B2
(45) Date of Patent: Dec. 19, 2023

(54) BOOT METHOD FOR EMBEDDED SYSTEM INCLUDING FIRST AND SECOND BASEBOARD MANAGEMENT CONTROLLER (BMC) AND OPERATING SYSTEM (OS) IMAGE FILE USING SHARED NON-VOLATILE MEMORY MODULE

(71) Applicant: MITAC COMPUTING TECHNOLOGY CORPORATION, Taoyuan (TW)

(72) Inventors: Yu-Shu Yeh, Taoyuan (TW); Heng-Chia Hsu, Taoyuan (TW); Chen-Yin Lin, Taoyuan (TW); Chien-Chung Wang, Taoyuan (TW); Chin-Hung Tan, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 50 days.

(21) Appl. No.: 17/853,202

(22) Filed: Jun. 29, 2022

(65) Prior Publication Data

US 2023/0009689 A1    Jan. 12, 2023

(30) Foreign Application Priority Data

Jul. 12, 2021   (TW) .................................. 110125457

(51) Int. Cl.
*G06F 9/4401* (2018.01)
*G06F 9/445* (2018.01)

(52) U.S. Cl.
CPC .......... *G06F 9/4401* (2013.01); *G06F 9/4408* (2013.01); *G06F 9/4403* (2013.01); *G06F 9/445* (2013.01)

(58) Field of Classification Search
CPC ...... G06F 9/4401; G06F 9/4403; G06F 9/445; G06F 9/4408
See application file for complete search history.

(56) References Cited

U.S. PATENT DOCUMENTS

| 8,732,446 B2 * | 5/2014 | Park ...................... G06F 9/4406 713/2 |
| 10,394,570 B2 * | 8/2019 | Baik ..................... G06F 9/4406 |

(Continued)

FOREIGN PATENT DOCUMENTS

TW          202034165 A          9/2020

OTHER PUBLICATIONS

Search Report appended to an Office Action, which was issued to Taiwanese counterpart application No. 110125457 by the TIPO dated Feb. 14, 2022, with an English translation thereof.

*Primary Examiner* — Tammara R Peyton
(74) *Attorney, Agent, or Firm* — Michael Best & Friedrich LLP

(57) ABSTRACT

A boot method for an embedded system is provided. The embedded system includes two mainboards each provided with a baseboard management controller (BMC), a non-volatile memory unit and a network adapter. When the embedded system is turned on, each of the BMCs performs a boot procedure, and then loads an operating system (OS) image file from a corresponding non-volatile memory unit to execute an operating system. When one BMC fails to load the OS image file or to execute the operating system, the BMC causes the corresponding network adapter to communicate with the other network adapter to acquire the OS image file from the non-volatile memory unit on the other mainboard, so as to replace the OS image file in the corresponding non-volatile memory unit, and directly loads the OS image thus acquired to execute the operating system.

19 Claims, 2 Drawing Sheets

(56) References Cited

U.S. PATENT DOCUMENTS

| | | | |
|---|---|---|---|
| 11,361,067 B2* | 6/2022 | Chen | H04L 9/3247 |
| 11,409,518 B2* | 8/2022 | Maddukuri | G06F 16/23 |
| 11,573,737 B2* | 2/2023 | Su | G06F 11/3089 |
| 2018/0121210 A1* | 5/2018 | Costa | G06F 9/4401 |

* cited by examiner

BOOT METHOD FOR EMBEDDED SYSTEM INCLUDING FIRST AND SECOND BASEBOARD MANAGEMENT CONTROLLER (BMC) AND OPERATING SYSTEM (OS) IMAGE FILE USING SHARED NON-VOLATILE MEMORY MODULE

CROSS-REFERENCE TO RELATED APPLICATION

This application claims priority of Taiwanese Invention Patent Application No. 110125457, filed on Jul. 12, 2021.

FIELD

The disclosure relates to a boot method for an embedded system, which can restore errors of system image files.

BACKGROUND

Embedded systems generally refer to non-PC systems, and have computer functions that are application-centric. An embedded system is usually a dedicated computer system of which hardware and software can be added or removed, so as to meet specific stringent requirements in terms of function, reliability, cost, size, power consumption, etc. A conventional embedded system (e.g., a conventional embedded storage system) includes two mainboards, two baseboard management controllers (BMC), and four non-volatile memory units. The two baseboard management controllers are respectively provided on the two mainboards. Two of the non-volatile memory units are provided on one of the mainboards, and the other two of the non-volatile memory units are provided on the other mainboard. For each of the mainboards, the corresponding baseboard management controller is electrically connected to the corresponding two non-volatile memory units. Each of the non-volatile memory units stores a boot image file, an operating system image file, a file system image file, and an application image file.

The baseboard management controller and the non-volatile memory units on one of the mainboards cooperate to form a mutual backup system. When the baseboard management controller fails to run the boot process using one of the non-volatile memory units on the same mainboard as the baseboard management controller, the baseboard management controller will reload the boot image, the operating system image, the file system image, and the application image from the other non-volatile memory unit on that same mainboard, so as to ensure that the boot process can run properly and the operating system can load successfully. In other words, existing embedded systems require a total of four such non-volatile memory units to ensure proper boot process execution.

SUMMARY

Therefore, an object of the disclosure is to provide a boot method for an embedded system. The boot method can restore errors of an operating system image file for the embedded system and uses relatively fewer non-volatile memory units.

According to the disclosure, the embedded system includes a first mainboard and a second mainboard, a first baseboard management controller (BMC) and a second BMC respectively mounted on the first mainboard and the second mainboard, a first non-volatile memory unit and a second non-volatile memory unit respectively mounted on the first mainboard and the second mainboard, and a first network adapter and a second network adapter respectively mounted on the first mainboard and the second mainboard. Each of the first non-volatile memory unit and the second non-volatile memory unit stores a boot image file and an operating system (OS) image file therein, the first non-volatile memory unit and the first network adapter correspond to the first BMC, and the second non-volatile memory unit and the second network adapter correspond to the second BMC. The boot method includes steps of: by each of the first BMC and the second BMC, when the embedded system is turned on, loading the boot image file from the corresponding one of the first non-volatile memory unit and the second non-volatile memory unit to execute a boot procedure; by each of the first BMC and the second BMC, after execution of the boot procedure, loading the OS image file from the corresponding one of the first non-volatile memory unit and the second non-volatile memory unit to execute an operating system; when one of the first BMC and the second BMC fails to perform one of the loading the OS image file and the executing the operating system, by said one of the first BMC and the second BMC, causing the corresponding one of the first network adapter and the second network adapter to communicate with the other one of the first network adapter and the second network adapter, so as to acquire the OS image file stored in the other one of the first non-volatile memory unit and the second non-volatile memory unit that corresponds to the other one of the first BMC and the second BMC; and by said one of the first BMC and the second BMC, using the OS image file acquired from the other one of the first non-volatile memory unit and the second non-volatile memory unit to replace the OS image file stored in the corresponding one of the first non-volatile memory unit and the second non-volatile memory unit, and directly loading the OS image file acquired from the other one of the first non-volatile memory unit and the second non-volatile memory unit to execute the operating system.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
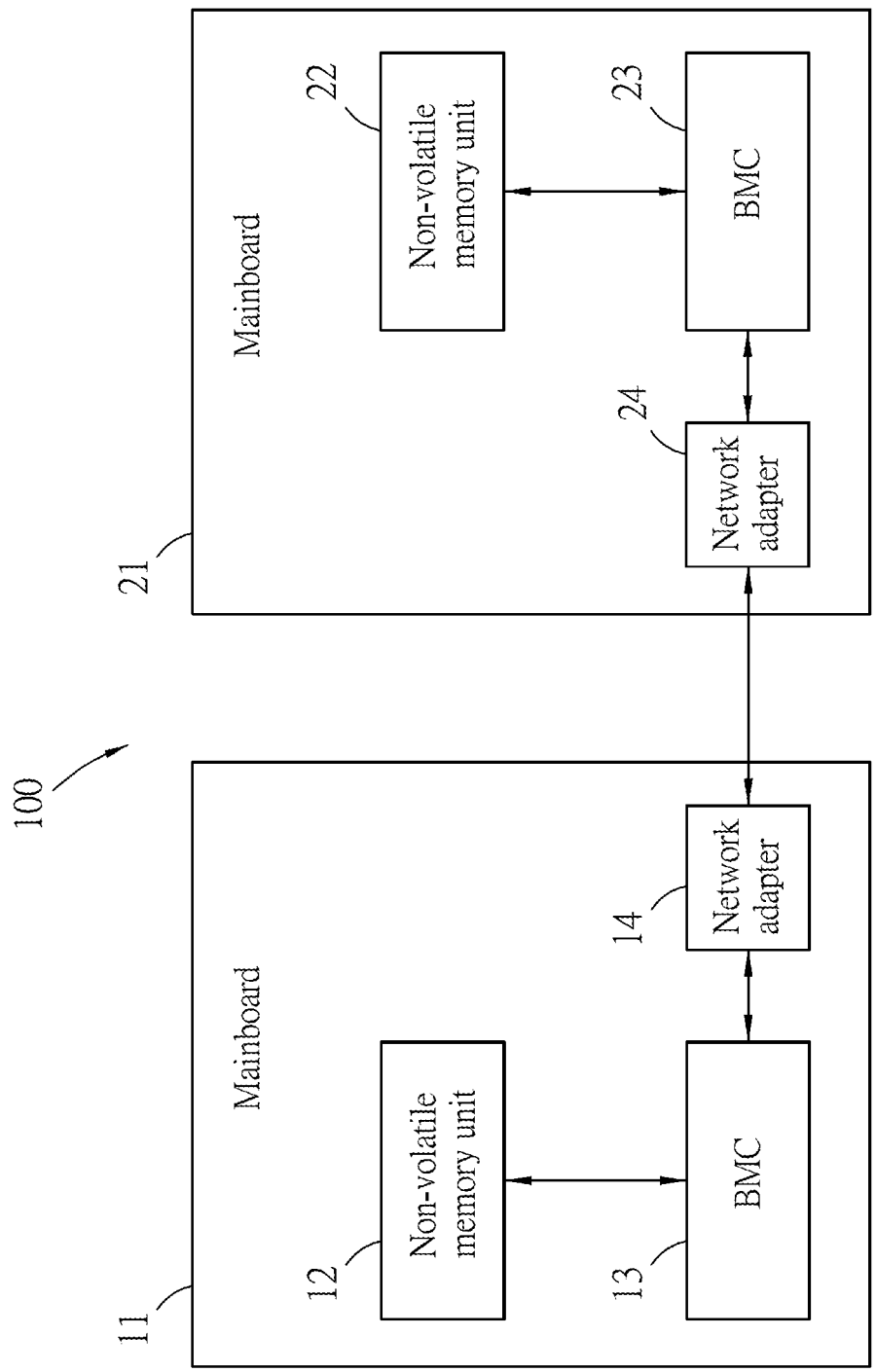
FIG. 1 is a block diagram illustrating an exemplary embedded system that implements an embodiment of a boot method according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a boot method according to this disclosure is adapted for an embedded system 100. The embedded system 100 includes a first mainboard 11 provided with a first BMC 13, a first non-volatile memory unit 12 and a first network adapter 14, and a second mainboard 21 provided with a second BMC 23, a second non-volatile memory unit 22 and a second network adapter 24. The first BMC 13 is electrically connected to the first non-volatile memory unit 12 and the first network adapter 14, and the second BMC 23 is electrically connected to the second non-volatile memory unit 22 and the second network adapter 24. In this embodiment, the first BMC 13, the first non-volatile memory unit 12 and the first network adapter 14 are deemed to correspond to each other because they are all mounted on the first mainboard 11. Similarly, the second BMC 23, the second non-volatile memory unit 22 and the second network adapter 24 are deemed to correspond to each other because they are all mounted on the second mainboard 21. Each of the first non-volatile memory unit 12 and the second non-volatile memory unit 22 may be realized as, for example but not limited to, a hard disk drive, a solid state drive, a flash memory module, etc., and stores a boot image file, an operating system (OS) image file, a file system image file, and an application image file. In this embodiment, the boot image file corresponds to a bootloader that is a program to execute the boot image file, and the OS image file corresponds to a Linux kernel that is a program to execute the OS image file, but this disclosure is not limited in this respect. Each of the first network adapter 14 and the second network adapter 24 supports a Preboot eXecution Environment (PXE) mechanism. It is noted that the embedded system 100 is free of any basic input/output system (BIOS).

Figure 2:
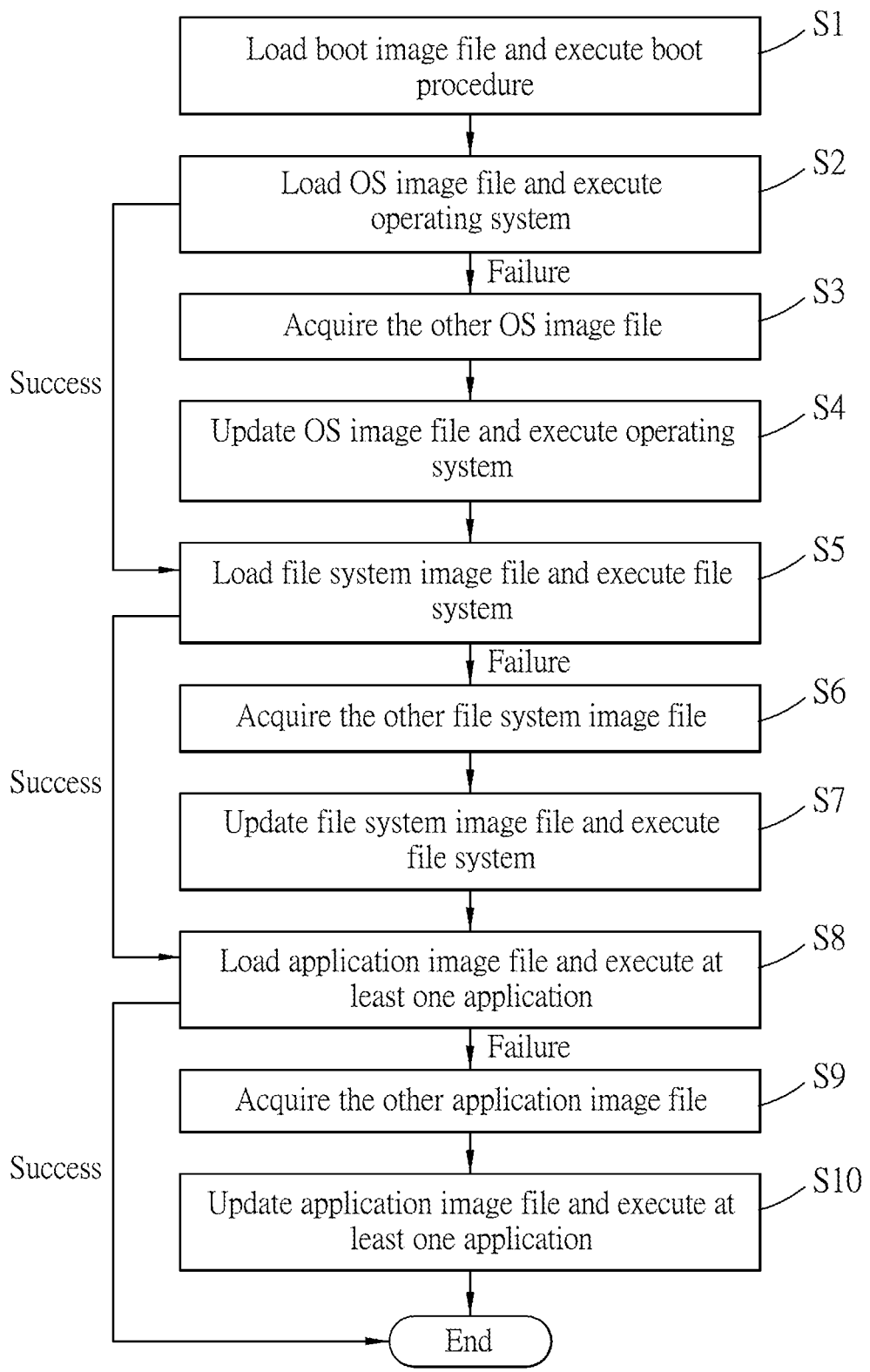
FIG. 2 is a flow chart illustrating steps of the embodiment.

Referring to FIG. 2, the embodiment of the boot method according to this disclosure includes steps S1 to S10. Although both of the first BMC 13 and the second BMC 23 perform the flow, the following description for steps S1 to S10 focuses on operation of a single BMC, which can be either the first BMC 13 or the second BMC 23, for ease of explanation.

In step S1, when the embedded system 100 is turned on, the BMC (13, 23) loads the boot image file from a corresponding one (i.e., the one on the same mainboard (11, 21) as the BMC (13, 23)) of the first non-volatile memory unit 12 and the second non-volatile memory unit 22, so as to execute a boot procedure and to initialize the BMC (13, 23). The boot image file includes support for the PXE mechanism.

In step S2, after execution of the boot procedure, the BMC (13, 23) loads the OS image file from the corresponding one of the first non-volatile memory unit 12 and the second non-volatile memory unit 22, so as to execute an operating system. When the OS image file is successfully loaded and the operating system is successfully executed, the flow goes to step S5. When the BMC (13, 23) fails to load the OS image file or fails to execute the operating system, the flow goes to step S3.

In step S3, the BMC (13, 23) causes a corresponding one (i.e., the one on the same mainboard (11, 21) as the BMC (13, 23)) of the first network adapter 14 and the second network adapter 24 to communicate with the other one of the first network adapter 14 and the second network adapter 24 via the PXE mechanism, so as to acquire the OS image file from the other one (i.e., the one on a different mainboard (11, 21) as the BMC (13, 23)) of the first non-volatile memory unit 12 and the second non-volatile memory unit 22 (i.e., one of the first non-volatile memory unit 12 and the second non-volatile memory unit 22 that corresponds to the other one of the first BMC 13 and the second BMC 23). In detail, when the first network adapter 14 and the second network adapter 24 that support the PXE mechanism are successfully initialized in the boot procedure, each of them can use a conventional protocol to continuously monitor whether the counterpart issues a request, so it will know when the OS image file that is stored in the corresponding one of the first non-volatile memory unit 12 and the second non-volatile memory unit 22 has to be provided to the counterpart. In this embodiment, data transfer between each of the first BMC 13 and the second BMC 23 and the corresponding one of the first network adapter 14 and the second network adapter 24 is performed using reduced gigabit media independent interface (RGMII), and data transfer between the first network adapter 14 and the second network adapter 24 is performed using serial gigabit media independent interface (SGMII), but this disclosure is not limited in this respect.

In step S4, the BMC (13, 23) uses the OS image file acquired from the other one of the first non-volatile memory unit 12 and the second non-volatile memory unit 22 to replace the OS image file stored in the corresponding one of the first non-volatile memory unit 12 and the second non-volatile memory unit 22, and directly (i.e., without reboot) loads the OS image file acquired from the other one of the first non-volatile memory unit 12 and the second non-volatile memory unit 22 to execute the operating system.

In step S5, after execution of the operating system, the BMC (13, 23) loads the file system image file from the corresponding one of the first non-volatile memory unit 12 and the second non-volatile memory unit 22, so as to execute a file system. When the file system image file is successfully loaded and the file system is successfully executed, the flow goes to step S8. When the BMC (13, 23) fails to load the file system image file or fails to execute the file system, the flow goes to step S6.

In step S6, the BMC (13, 23) causes the corresponding one of the first network adapter 14 and the second network adapter 24 to communicate with the other one of the first network adapter 14 and the second network adapter 24 via the PXE mechanism, so as to acquire the file system image file from the other one of the first non-volatile memory unit 12 and the second non-volatile memory unit 22.

In step S7, the BMC (13, 23) uses the file system image file acquired from the other one of the first non-volatile memory unit 12 and the second non-volatile memory unit 22 to replace the file system image file stored in the corresponding one of the first non-volatile memory unit 12 and the second non-volatile memory unit 22, and directly (i.e., without reboot) loads the file system image file acquired from the other one of the first non-volatile memory unit 12 and the second non-volatile memory unit 22 to execute the file system.

In step S8, after execution of the file system, the BMC (13, 23) loads the application image file from the corresponding one of the first non-volatile memory unit 12 and the second non-volatile memory unit 22, so as to execute at least one application. When the application image file is successfully loaded and the at least one application is successfully executed, the flow ends. When the BMC (13, 23) fails to load the application image file or fails to execute the at least one application, the flow goes to step S9.

In step S9, the BMC (13, 23) causes the corresponding one of the first network adapter 14 and the second network adapter 24 to communicate with the other one of the first network adapter 14 and the second network adapter 24 via the PXE mechanism, so as to acquire the application system image file from the other one of the first non-volatile memory unit 12 and the second non-volatile memory unit 22.

In step S10, the BMC (13, 23) uses the application image file acquired from the other one of the first non-volatile memory unit 12 and the second non-volatile memory unit 22 to replace the application image file stored in the corresponding one of the first non-volatile memory unit 12 and the second non-volatile memory unit 22, and directly (i.e., without reboot) loads the application image file acquired from the other one of the first non-volatile memory unit 12 and the second non-volatile memory unit 22 to execute the at least one application.

As a result, each of the mainboards 11, 21 serves as a backup for the other one of the mainboards. When one of the mainboards 11, 21 or one of the first BMC 13 and the second BMC 23 malfunctions or fails, the other one that functions normally can be used to maintain the operation of the embedded system 100. Although each of the mainboards 11, 12 or each of the first BMC 13 and the second BMC 23 can work independently, they communicate with each other to keep the data stored in the first non-volatile memory unit 12 and the second non-volatile memory unit 22 intact, so even if one of them malfunctions or fails, the other one that serves as a backup can immediately take over for the one that malfunctions or fails.

It is noted that, in addition to loading the boot image file to execute the boot procedure, loading the OS image file to execute the operating system, loading the file system image file to execute the file system and loading the application image file to execute the at least one application, the BMC (13, 23) may further activate other components (e.g., another system on a chip (SoC)) on the same mainboard (11, 21), and/or execute environmental monitoring (e.g., reading a temperature value from a temperature sensor, monitoring/controlling a fan speed, etc.) on the embedded system 100. The at least one application may include, for example, a high availability (HA) program, a system monitoring program, an interface program, and so on, wherein the HA software program determines which one of the mainboards 11, 12 is to serve as an active and which one of the mainboards 11, 12 is to serve as a backup; the system monitoring program acquires an ambient temperature and determines whether the embedded system 100 functions normally, and periodically provides the system status acquired by the active to the backup; and the interface program provides a communication interface for said another SoC. Said another SoC may issue commands (e.g., a RESET command) through the communication interface to, for example but not limited to, check a status of the embedded system 100, control light indicators of the embedded system 100, etc.

To sum up, through the first and second network adapters 14, 24 that support the PXE mechanism, the BMC (13, 23) can acquire the required image file (i.e., the OS image file, the file system image file, or the application image file) from the non-volatile memory unit on the other mainboard when failing to load the required image file from the corresponding non-volatile memory unit or failing to execute the operating system, the file system or the application(s), so as to directly use the image file thus acquired from the other mainboard to, without reboot, successfully execute the operating system, the file system or the application(s). Compared to the conventional embedded system, the embodiment of this disclosure can also restore the errors related to the OS image file, the file system image file and the application image file while using fewer non-volatile memory units. In addition, the embodiment of this disclosure restores only the OS image file, the file system image file or the application image file that is related to the failed operation without modifying the boot image file, so reboot is not required.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A boot method for an embedded system, comprising steps of:

providing the embedded system that includes a first mainboard and a second mainboard, a first baseboard management controller (BMC) and a second BMC respectively mounted on the first mainboard and the second mainboard, a first non-volatile memory unit and a second non-volatile memory unit respectively mounted on the first mainboard and the second mainboard, and a first network adapter and a second network adapter respectively mounted on the first mainboard and the second mainboard, wherein each of the first non-volatile memory unit and the second non-volatile memory unit stores a boot image file and an operating system (OS) image file therein, the first non-volatile memory unit and the first network adapter correspond to the first BMC, and the second non-volatile memory unit and the second network adapter correspond to the second BMC;

by each of the first BMC and the second BMC, when the embedded system is turned on, loading the boot image file from the corresponding one of the first non-volatile memory unit and the second non-volatile memory unit to execute a boot procedure;

by each of the first BMC and the second BMC, after execution of the boot procedure, loading the OS image file from the corresponding one of the first non-volatile memory unit and the second non-volatile memory unit to execute an operating system;

when one of the first BMC and the second BMC fails to perform one of the loading the OS image file and the executing the operating system, by said one of the first BMC and the second BMC, causing the corresponding one of the first network adapter and the second network adapter to communicate with the other one of the first network adapter and the second network adapter, so as to acquire the OS image file stored in the other one of the first non-volatile memory unit and the second non-volatile memory unit that corresponds to the other one of the first BMC and the second BMC; and by said one of the first BMC and the second BMC, using the OS image file acquired from the other one of the first non-volatile memory unit and the second non-volatile memory unit to replace the OS image file stored in the corresponding one of the first non-volatile memory unit and the second non-volatile memory unit, and directly loading the OS image file acquired from the other one of the first non-volatile memory unit and the second non-volatile memory unit to execute the operating system.

2. The boot method of claim 1, wherein the boot image file includes support for a Preboot execution Environment (PXE) mechanism, and, in the step of causing the corresponding one of the first network adapter and the second network adapter to acquire the OS image file stored in the other one of the first non-volatile memory unit and the second non-volatile memory unit, the first network adapter and the second network adapter communicate with each other through the PXE mechanism.

3. The boot method of claim 2, wherein each of the boot image files that are respectively stored in the first non-volatile memory unit and the second non-volatile memory unit corresponds to a bootloader, and each of the OS image files that are respectively stored in the first non-volatile memory unit and the second non-volatile memory unit corresponds to a Linux kernel.

4. The boot method of claim 3, wherein each of the first non-volatile memory unit and the second non-volatile memory unit further stores a file system image file, said boot method further comprising steps of:
by each of the first BMC and the second BMC, after execution of the operating system, loading the file system image file from the corresponding one of the first non-volatile memory unit and the second non-volatile memory unit to execute a file system;
when one of the first BMC and the second BMC fails to perform one of the loading the file system image file and the executing the file system, by said one of the first BMC and the second BMC, causing the corresponding one of the first network adapter and the second network adapter to communicate with the other one of the first network adapter and the second network adapter, so as to acquire the file system image file stored in the other one of the first non-volatile memory unit and the second non-volatile memory unit that corresponds to the other one of the first BMC and the second BMC; and
by said one of the first BMC and the second BMC, using the file system image file acquired from the other one of the first non-volatile memory unit and the second non-volatile memory unit to replace the file system image file stored in the corresponding one of the first non-volatile memory unit and the second non-volatile memory unit, and directly loading the file system image file acquired from the other one of the first non-volatile memory unit and the second non-volatile memory unit to execute the file system.

5. The boot method of claim 4, wherein each of the first non-volatile memory unit and the second non-volatile memory unit further stores an application image file, said boot method further comprising steps of:
by each of the first BMC and the second BMC, after execution of the file system, loading the application system image file from the corresponding one of the first non-volatile memory unit and the second non-volatile memory unit to execute at least one application;
when one of the first BMC and the second BMC fails to perform one of the loading the application image file and the executing the at least one application, by said one of the first BMC and the second BMC, causing the corresponding one of the first network adapter and the second network adapter to communicate with the other one of the first network adapter and the second network adapter, so as to acquire the application image file stored in the other one of the first non-volatile memory unit and the second non-volatile memory unit that corresponds to the other one of the first BMC and the second BMC; and
by said one of the first BMC and the second BMC, using the application image file acquired from the other one of the first non-volatile memory unit and the second non-volatile memory unit to replace the application image file stored in the corresponding one of the first non-volatile memory unit and the second non-volatile memory unit, and directly loading the application image file acquired from the other one of the first non-volatile memory unit and the second non-volatile memory unit to execute the at least one application.

6. The boot method of claim 1, wherein the step of directly loading the OS image file acquired from the other one of the first non-volatile memory unit and the second non-volatile memory unit to execute the operating system is performed without reboot;
wherein, in the step of causing the corresponding one of the first network adapter and the second network adapter to acquire the file system image file stored in the other one of the first non-volatile memory unit and the second non-volatile memory unit, the first network adapter and the second network adapter communicate with each other through the PXE mechanism;
wherein the step of directly loading the file system image file acquired from the other one of the first non-volatile memory unit and the second non-volatile memory unit to execute the file system is performed without reboot;
wherein, in the step of causing the corresponding one of the first network adapter and the second network adapter to acquire the application image file stored in the other one of the first non-volatile memory unit and the second non-volatile memory unit, the first network adapter and the second network adapter communicate with each other through the PXE mechanism; and
wherein the step of directly loading the application image file acquired from the other one of the first non-volatile memory unit and the second non-volatile memory unit to execute the at least one application is performed without reboot.

7. The boot method of claim 1, wherein the embedded system is free of any basic input/output system (BIOS).

8. The boot method of claim 1, wherein the boot image file corresponds to a bootloader, and the OS image file corresponds to a Linux kernel.

9. The boot method of claim 1, wherein each of the first non-volatile memory unit and the second non-volatile memory unit further stores a file system image file, said boot method further comprising steps of:
by each of the first BMC and the second BMC, after execution of the operating system, loading the file system image file from the corresponding one of the first non-volatile memory unit and the second non-volatile memory unit to execute a file system;
when one of the first BMC and the second BMC fails to perform one of the loading the file system image file and the executing the file system, by said one of the first BMC and the second BMC, causing the corresponding one of the first network adapter and the second network adapter to communicate with the other one of the first network adapter and the second network adapter, so as to acquire the file system image file stored in the other one of the first non-volatile memory unit and the second non-volatile memory unit that corresponds to the other one of the first BMC and the second BMC; and by said one of the first BMC and the second BMC, using the file system image file acquired from the other one of the first non-volatile memory unit and the second non-volatile memory unit to replace the file system image file stored in the corresponding one of the first non-volatile memory unit and the second non-volatile memory unit, and directly loading the file system image file acquired from the other one of the first non-volatile memory unit and the second non-volatile memory unit to execute the file system.

10. The boot method of claim 9, wherein each of the first non-volatile memory unit and the second non-volatile memory unit further stores an application image file, said boot method further comprising steps of:

by each of the first BMC and the second BMC, after execution of the file system, loading the application system image file from the corresponding one of the first non-volatile memory unit and the second non-volatile memory unit to execute at least one application;

when one of the first BMC and the second BMC fails to perform one of the loading the application image file and the executing the at least one application, by said one of the first BMC and the second BMC, causing the corresponding one of the first network adapter and the second network adapter to communicate with the other one of the first network adapter and the second network adapter, so as to acquire the application image file stored in the other one of the first non-volatile memory unit and the second non-volatile memory unit that corresponds to the other one of the first BMC and the second BMC; and by said one of the first BMC and the second BMC, using the application image file acquired from the other one of the first non-volatile memory unit and the second non-volatile memory unit to replace the application image file stored in the corresponding one of the first non-volatile memory unit and the second non-volatile memory unit, and directly loading the application image file acquired from the other one of the first non-volatile memory unit and the second non-volatile memory unit to execute the at least one application.

11. An embedded system, comprising:

a first mainboard and a second mainboard, a first baseboard management controller (BMC) and a second BMC respectively mounted on said first mainboard and said second mainboard, a first non-volatile memory unit and a second non-volatile memory unit respectively mounted on said first mainboard and said second mainboard, and a first network adapter and a second network adapter respectively mounted on said first mainboard and said second mainboard;

wherein each of said first non-volatile memory unit and said second non-volatile memory unit stores a boot image file and an operating system (OS) image file therein, said first non-volatile memory unit and said first network adapter correspond to said first BMC, and said second non-volatile memory unit and said second network adapter correspond to said second BMC, wherein, when the embedded system is turned on, each of said first BMC and said second BMC loads the boot image file from the corresponding one of said first non-volatile memory unit and said second non-volatile memory unit to execute a boot procedure;

wherein, after execution of the boot procedure, each of said first BMC and said second BMC loads the OS image file from the corresponding one of said first non-volatile memory unit and said second non-volatile memory unit to execute an operating system;

wherein, when one of said first BMC and said second BMC fails to perform one of the loading the OS image file and the executing the operating system, said one of said first BMC and said second BMC causes the corresponding one of said first network adapter and said second network adapter to communicate with the other one of said first network adapter and said second network adapter, so as to acquire the OS image file stored in the other one of said first non-volatile memory unit and said second non-volatile memory unit that corresponds to the other one of said first BMC and said second BMC; and said one of said first BMC and said second BMC uses the OS image file acquired from the other one of said first non-volatile memory unit and said second non-volatile memory unit to replace the OS image file stored in the corresponding one of said first non-volatile memory unit and said second non-volatile memory unit, and directly loads the OS image file acquired from the other one of said first non-volatile memory unit and said second non-volatile memory unit to execute the operating system.

12. The embedded system of claim 11, wherein the boot image file includes support for a Preboot eXecution Environment (PXE) mechanism, and said first network adapter and said second network adapter communicate with each other through the PXE mechanism.

13. The embedded system of claim 12, wherein each of the boot image files that are respectively stored in said first non-volatile memory unit and said second non-volatile memory unit corresponds to a bootloader, and each of the OS image files that are respectively stored in said first non-volatile memory unit and said second non-volatile memory unit corresponds to a Linux kernel.

14. The embedded system of claim 13, wherein each of said first non-volatile memory unit and said second non-volatile memory unit further stores a file system image file;

wherein each of said first BMC and said second BMC is configured to, after execution of the operating system, load the file system image file from the corresponding one of said first non-volatile memory unit and said second non-volatile memory unit to execute a file system;

wherein, when one of said first BMC and said second BMC fails to either load the file system image file or execute the file system, said one of the first BMC and the second BMC causes the corresponding one of said first network adapter and said second network adapter to communicate with the other one of said first network adapter and said second network adapter, so as to acquire the file system image file stored in the other one of said first non-volatile memory unit and said second non-volatile memory unit that corresponds to the other one of said first BMC and said second BMC; and wherein said one of the first BMC and the second BMC uses the file system image file acquired from the other one of said first non-volatile memory unit and said second non-volatile memory unit to replace the file system image file stored in the corresponding one of said first non-volatile memory unit and said second non-volatile memory unit, and directly loads the file system image file acquired from the other one of said first non-volatile memory unit and said second non-volatile memory unit to execute the file system.

15. The embedded system of claim 14, wherein each of said first non-volatile memory unit and said second non-volatile memory unit further stores an application image file;
wherein each of said first BMC and said second BMC is configured to, after execution of the file system, load the application system image file from the corresponding one of said first non-volatile memory unit and said second non-volatile memory unit to execute at least one application;
wherein, when one of said first BMC and said second BMC fails to either load the application image file or execute the at least one application, said one of said first BMC and said second BMC causes the corresponding one of said first network adapter and said second network adapter to communicate with the other one of said first network adapter and said second network adapter, so as to acquire the application image file stored in the other one of said first non-volatile memory unit and said second non-volatile memory unit that corresponds to the other one of said first BMC and said second BMC; and
wherein said one of said first BMC and said second BMC uses the application image file acquired from the other one of said first non-volatile memory unit and said second non-volatile memory unit to replace the application image file stored in the corresponding one of said first non-volatile memory unit and said second non-volatile memory unit, and directly loads the application image file acquired from the other one of said first non-volatile memory unit and said second non-volatile memory unit to execute the at least one application.

16. The embedded system of claim 15, wherein said one of said first BMC and said second BMC directly loads the OS image file acquired from the other one of said first non-volatile memory unit and said second non-volatile memory unit to execute the operating system without reboot, directly loads the file system image file acquired from the other one of said first non-volatile memory unit and said second non-volatile memory unit to execute the file system without reboot, and directly loads the application image file acquired from the other one of said first non-volatile memory unit and said second non-volatile memory unit to execute the at least one application without reboot.

17. The embedded system of claim 11, wherein the boot image file corresponds to a bootloader, and the OS image file corresponds to a Linux kernel.

18. The embedded system of claim 11, wherein each of said first non-volatile memory unit and said second non-volatile memory unit further stores a file system image file;
wherein each of said first BMC and said second BMC is configured to, after execution of the operating system, load the file system image file from the corresponding one of said first non-volatile memory unit and said second non-volatile memory unit to execute a file system;
wherein, when one of said first BMC and said second BMC fails to either load the file system image file or execute the file system, said one of said first BMC and said second BMC causes the corresponding one of said first network adapter and said second network adapter to communicate with the other one of said first network adapter and said second network adapter, so as to acquire the file system image file stored in the other one of said first non-volatile memory unit and said second non-volatile memory unit that corresponds to the other one of said first BMC and said second BMC; and
wherein said one of said first BMC and said second BMC uses the file system image file acquired from the other one of said first non-volatile memory unit and said second non-volatile memory unit to replace the file system image file stored in the corresponding one of said first non-volatile memory unit and said second non-volatile memory unit, and directly loads the file system image file acquired from the other one of said first non-volatile memory unit and said second non-volatile memory unit to execute the file system.

19. The embedded system of claim 11, wherein each of said first non-volatile memory unit and said second non-volatile memory unit further stores an application image file;
wherein each of said first BMC and said second BMC is configured to, after execution of the file system, load the application system image file from the corresponding one of said first non-volatile memory unit and said second non-volatile memory unit to execute at least one application;
wherein, when one of said first BMC and said second BMC fails to either load the application image file or execute the at least one application, said one of said first BMC and said second BMC causes the corresponding one of said first network adapter and said second network adapter to communicate with the other one of said first network adapter and said second network adapter, so as to acquire the application image file stored in the other one of said first non-volatile memory unit and said second non-volatile memory unit that corresponds to the other one of said first BMC and said second BMC; and
wherein said one of said first BMC and said second BMC uses the application image file acquired from the other one of said first non-volatile memory unit and said second non-volatile memory unit to replace the application image file stored in the corresponding one of said first non-volatile memory unit and said second non-volatile memory unit, and directly loads the application image file acquired from the other one of said first non-volatile memory unit and said second non-volatile memory unit to execute the at least one application.

* * * * *